(12) United States Patent
Scully

(10) Patent No.: US 6,363,326 B1
(45) Date of Patent: Mar. 26, 2002

(54) METHOD AND APPARATUS FOR DETECTING AN OBJECT ON A SIDE OF OR BACKWARDS OF A VEHICLE

(76) Inventor: Robert Lawrence Scully, 10 Newman Ave., Verona, NJ (US) 07044

( * ) Notice: Subject to any disclaimer, the term of this patent is extended or adjusted under 35 U.S.C. 154(b) by 0 days.

(21) Appl. No.: 09/722,224

(22) Filed: Nov. 27, 2000

Related U.S. Application Data

(63) Continuation of application No. 08/964,639, filed on Nov. 5, 1997, now abandoned.

(51) Int. Cl.[7] .................................................. G08G 1/16
(52) U.S. Cl. ........................ 701/301; 701/96; 340/903; 340/435
(58) Field of Search ........................... 701/301, 96, 49; 340/903, 904, 435, 436; 342/47, 73, 133, 455

(56) References Cited

U.S. PATENT DOCUMENTS

| | | | | |
|---|---|---|---|---|
| 3,697,985 A | * | 10/1972 | Faris et al. ................ 343/5 PD |
| 5,122,796 A | * | 6/1992 | Beggs et al. ................ 340/904 |
| 5,347,273 A | * | 9/1994 | Katiraie ...................... 340/903 |
| 5,463,384 A | * | 10/1995 | Juds ............................ 340/903 |
| 5,583,495 A | * | 12/1996 | Ben Lulu .................... 340/904 |
| 6,038,496 A | * | 3/2000 | Dobler et al. ................. 701/3 |

* cited by examiner

*Primary Examiner*—Tan Nguyen
(74) *Attorney, Agent, or Firm*—Edward Goldberg

(57) ABSTRACT

A method and apparatus are described for detecting obstacles in the "blind spot" of a motor vehicle's side mounted mirrors. Advantageously, the inventive apparatus is mounted on the vehicle as an attachment to the side mirror system or adjacent to it. The invention determines the presence of an obstacle in a sensing volume that encompasses the "blind spot". The invention relies on the time-of-flight measurement of preferably short infrared pulses to locate obstacles. Multiple sensors are used to provide area coverage. If any sensor detects an obstacle within its pre-defined range limits then an indication is provided by a display unit at the side mirror location. The system can be used on both sides of the vehicle and each side operates independently.

6 Claims, 3 Drawing Sheets

METHOD AND APPARATUS FOR DETECTING AN OBJECT ON A SIDE OF OR BACKWARDS OF A VEHICLE

This is a continuation of application Ser. No. 08/964,639 filed Nov. 5, 1997 now abandoned.

BACKGROUND OF THE INVENTION

Present day vehicular traffic in many areas can often be characterized as high density and high speed. Multilane highways afford the opportunity for passing on both sides of a vehicle, and aggressive drivers commonly weave their way through traffic, changing lanes many times in the process. Speed limits have been increased in many localities throughout the country. All this places demands on the driver to be aware of the surroundings and to be alert to changes which can happen quickly. It is also well known that side mounted mirrors have "blind spots" where overtaking vehicles may go undetected.

SUMMARY OF THE INVENTION

With the above considerations in mind, a system which could provide information to the driver prior to a lane change, on vehicles in the "blind spot" of the mirror system, would provide an additional measure of safety. Furthermore, if this system could be incorporated into or added onto the existing structure of the side mounted mirror and provide visual indication to the driver when the side mirror is viewed, then the device would require no additional driver actions beyond what is normally performed in a lane change.

The method and apparatus of the present invention detects the presence of objects within a sensing volume that encompasses the "blind spot" of the side mirrors provided on all vehicles. The "blind spot" of the side mirror system is a property of the vehicle body design, the mirror position and the viewing position of the vehicle operator. The sensing volume is defined as the volume covered by one or more sensing beams, each of which detects the presence of obstacles along its line of sight within a given distance and spatial location. The number of beams, directional orientation and beam width are arranged to provide indication of any obstacle above a minimum size corresponding to a motor vehicle or motorcycle, that may be present in the sensing volume, which itself covers the vehicle's "blind spot" to the rear and side of the vehicle.

Preferably, the invention is implemented in a system comprising a control unit and multiple transmitting and sensing units that working together (1) locate objects along the lines-of-sight of the respective sensing elements, (2) by time-of-flight or time interval analysis calculate the distance to the sensed object, and (3) provide indication of objects within a predefined sensing envelope or spatial location.

Advantageously, the system is implemented using pulsed infrared laser transmitters, photodiode receiver circuits including amplification and signal conditioning, a digital clock for elapsed time measurement, one or more digital signal processors or microprocessors for system control and algorithm realization, and a display module for indication of sensing volume status or presence of an obstacle.

The invention relies on the principle of the time-of-flight or elapsed time measurement of short infrared pulses to determine the distance, on a suitable algorithm to filter the result through a range gate corresponding to a selected range along the line of sight, and on multiple sensing beams to provide full target area coverage.

Additionally the system provides visual display at the location of the vehicle side mounted mirror permitting simultaneous viewing of the mirror image of the roadway and the indicator display of the present invention.

These and other objects, features and advantages of the invention will be more readily apparent from the following detailed description in conjunction with the accompanying drawings.

DETAILED DESCRIPTION OF THE PREFERRED EMBODIMENTS

Figure 1:
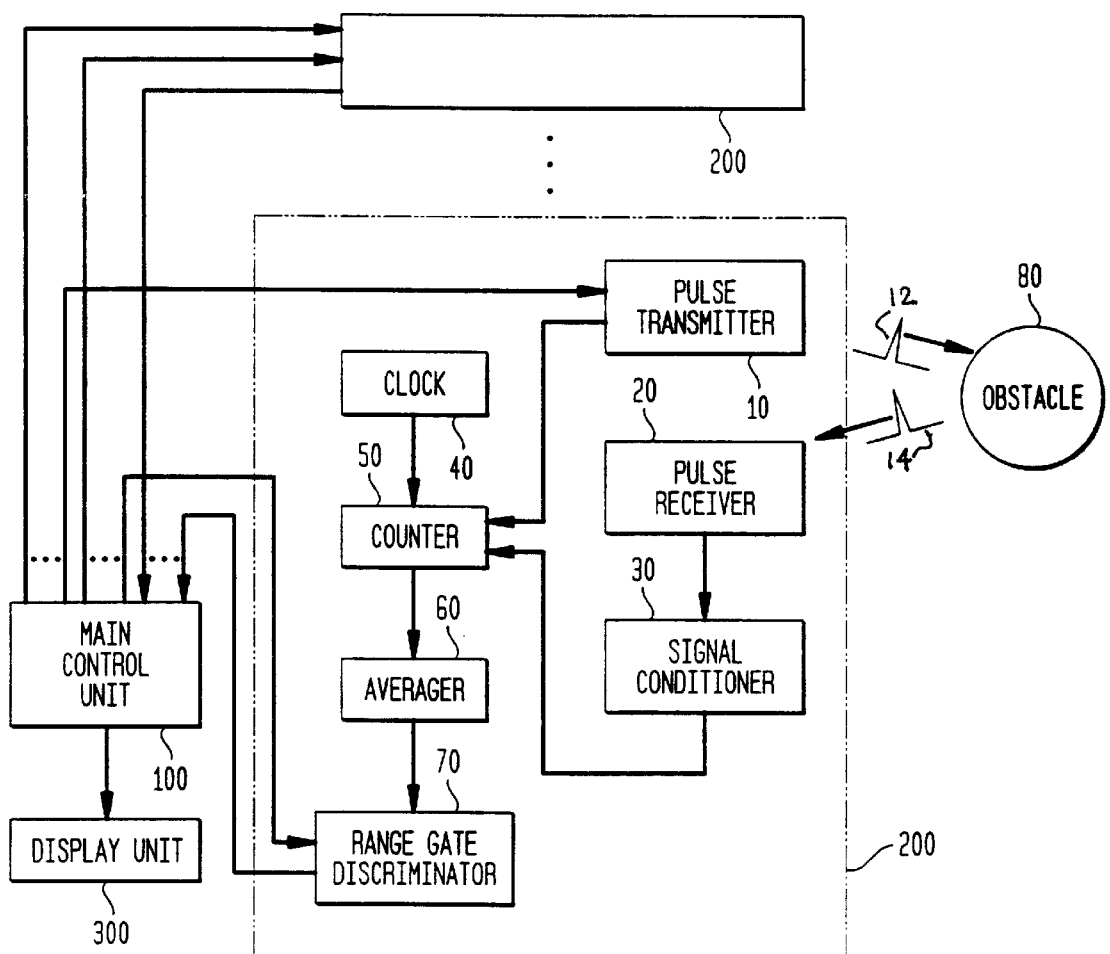
FIG. 1 is a functional block diagram of the preferred embodiment of the invention.

As shown in FIG. 1, the system of the present invention comprises a main control unit 100 and at least one, and preferably several, rangefinder units 200. Each rangefinder unit comprises a pulse transmitter, 10, a pulse receiver 20, a signal conditioner 30, a clock 40, a counter 50, an averager 60 and a range gate discriminator 70.

Control unit 100 sets the firing sequence of the individual units, stores data from the rangefinder units, provides system analysis and provides output for display of status in the display unit 300. Illustratively, control unit 100 is a conventional microprocessor, microcontroller, or a digital signal processor.

Each individual rangefinder unit 200 measures the distance to objects in its sensing direction through the measurement of the elapsed time-of-flight of a short infrared pulse. Each transmitter 10 projects a narrow beam infrared pulse 12 and each receiver unit 20 detects reflected return pulses 14 from an obstacle 80 and provides initial amplification. Illustratively, each transmitter operates at a pulse repetition rate of 60 kHz, so that a single pulse is emitted every 16.7 $\mu$seconds. Return signals are amplified and gain adjusted in signal conditioner 30, in order to provide a uniform return signal for further analysis. A digital clock 40 and a counter 50 are used to determine the time interval between the initiation of the transmitted pulse and the return of the reflected pulse. In particular, a signal from transmitter 10 causes counter 50 to begin counting clock pulses when an infrared pulse is emitted by the transmitter; and a signal from receiver 20 through signal conditioner 30 causes counter 50 to stop counting when the reflected pulse is received by receiver 20. The count is then provided to the data averager 60. The data averager 60 collects and stores the average of a predetermined number of successive readings, for example, ten. The average reading is provided to the range gate 70, which tests the reading to determine if it falls within the preset sensing limits. If the output for any single one of the rangefinder units 200 represents a return signal from a distance which falls within the range gate window for that rangefinder, then the control unit 100 provides an indication in display unit 300 that an obstacle 80 is within the sensing volume.

Advantageously, each transmitter unit 10 is an infrared laser diode that produces a fast rise time pulse. The measurement of the distance to an obstacle using the elapsed time for a pulse to be transmitted to an obstacle, and returned to the receiver by reflection from the obstacle, is dependent, in part, on the temporal width of the pulse. Since the return pulse has been distorted due to reflection from the obstacle, there is a potential error in the measurement of the elapsed time interval of the order of the width of the pulse itself. To minimize this error, a short temporal pulse is desirable. Since light travels approximately one foot per nanosecond, a pulse width of 5 nanoseconds, for example, would correspond to a maximum distance error of 2.5 feet, since the distance traveled by the light pulse is twice the distance between the source and the obstacle. For this reason pulse width is of the order of five nanoseconds or smaller. A beam width of approximately 10 degrees is formed. Advantageously, the receiver 20 is a photodiode or avalanche photodiode, and the signal conditioner 30 provides a uniform response to reflected pulses that are received by the receiver.

Display unit 300 has visual displays preferably utilizing light emitting diodes (LEDs) which indicate power on, no obstacle present in the sensing volume, or obstacle present in the sensing volume. These conditions respectively are indicated by energized LEDs of yellow, green and red color, permitting instantaneous reading of sensing volume status. The LEDs can be continuously lit or blinking.

The time reading of the transit time of the reflected pulse constitutes the basic measured parameter of the system. The time measurement of each rangefinder is used as a measure of the distance to the obstacle that reflects the transmitted pulse.

Figure 2:
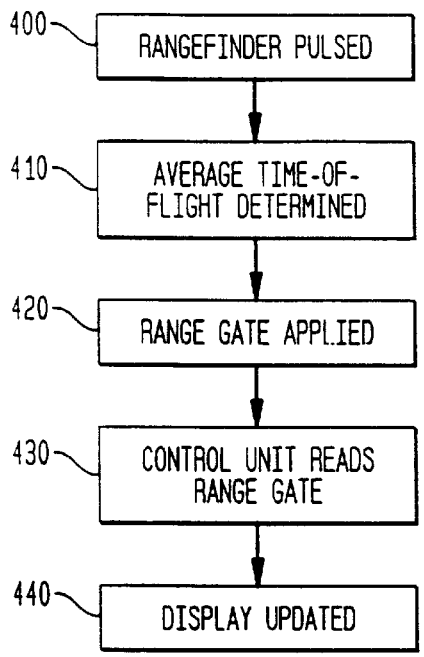
FIG. 2 is a flow chart illustrating the processing of information within the system.

A flowchart depicting the operation of the system is set forth in FIG. 2. At step 400, control unit 100 triggers the pulse transmitter 10 of each rangefinder unit so that each transmitter operates at a pulse repetition rate of $6.0 \times 10^4$ pulses per second, for a predetermined number of pulses, for example, ten. At step 410, an average elapsed time-of-flight is determined by the system averager 60. At step 420, the range gate discriminator 70 is applied to the time-of-flight determination to ascertain whether the measurement falls within the limits of the sensing volume for the path of that rangefinder unit. At step 430 the main control unit reads the range gate discriminator and provides an update in step 440 to the display unit 300. The main control unit 100 repeats the process for the next rangefinder unit 200, and continuously provides update to the display unit 300. Since the system will provide an indication of an obstacle within the sensing volume, the response of the individual rangefinder units are independently considered by the main control unit and it is only necessary for a single unit to register an obstacle such as an overtaking vehicle within its range gate for the main control unit to provide an indication of an obstacle present.

Figure 4:
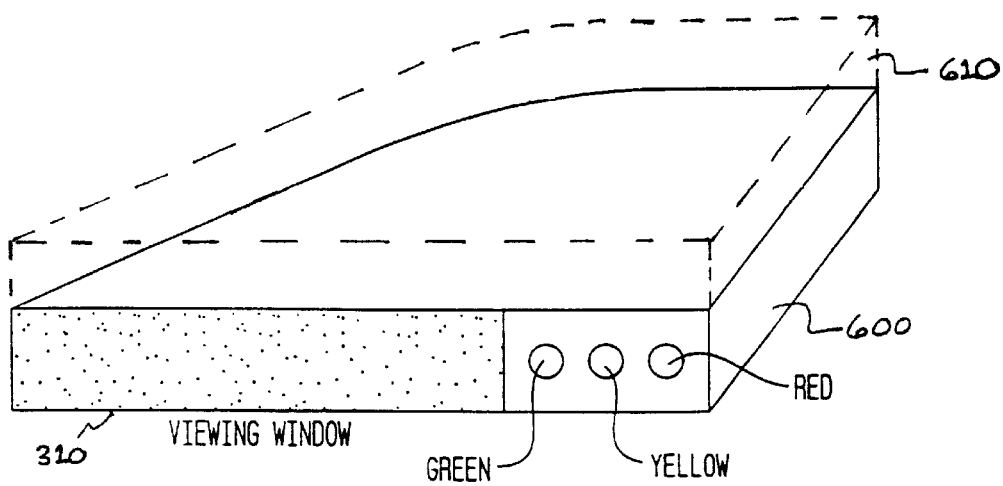
FIG. 4 is a schematic outline of the invention as appended to the side mirror structure.
Figure 3:
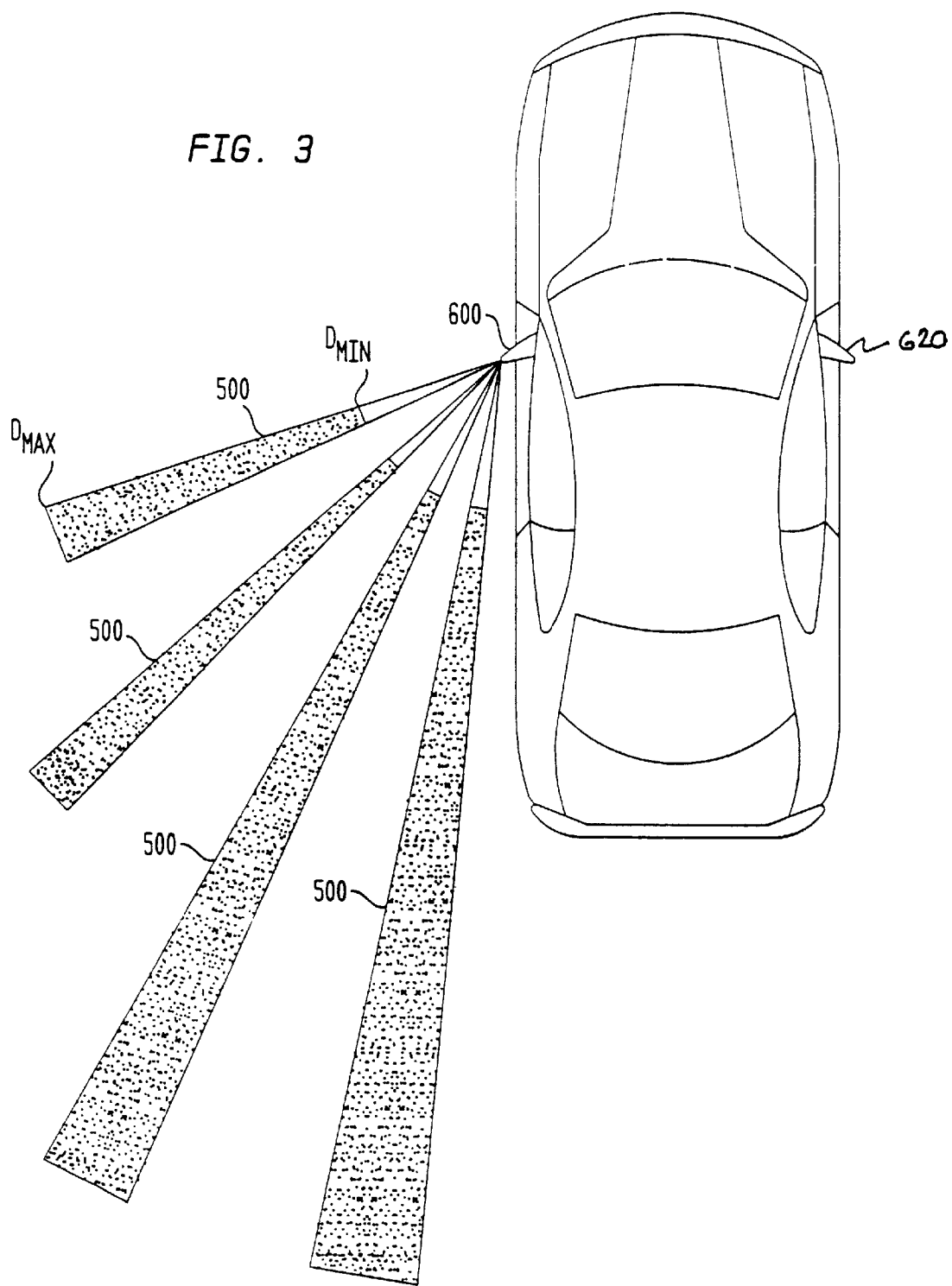
FIG. 3 is a schematic depicting the area of coverage of a multiple rangefinder system.

FIG. 3 illustrates the concept of the sensing volume, or distance and spatial location to the rear and side of a vehicle, that is covered with the system of this invention. In the preferred embodiment, the rangefinder unit 200 and the display unit 300 including a viewing window are mounted in an enclosure 600 that fits beneath the side mirror and can be incorporated into the mirror structure. The control unit 100 can also be mounted within the enclosure. A schematic outline drawing of enclosure 600 including viewing window 310 and side mirror 610, indicated in dashed lines, is shown in FIG. 4.

What is depicted in FIG. 3 is a four beam system, each beam being shown with an approximate 8 degree width. The lined area 500 corresponds to the sensing volume, with the range gate for each individual beam being defined as between the closest distance, $D_{min}$, and the farthest distance, $D_{max}$, from the rangefinder 200, along the beam direction, that falls within the lined area. Since distance from the rangefinder unit is given by one-half the pulse transit time from projected to return pulses multiplied by the speed of light, $D_{min}$ can be converted to a $T_{min}$, according to the equation:

$$T_{min}=(2 \times D_{min})/c$$

where c is the speed of light and $D_{min}$ is the desired minimum range, and $T_{min}$ is the corresponding minimum transit time.

A similar equation can be written for the maximum transit time interval.

As can be seen from FIG. 3, each beam has a unique range gate corresponding to its traverse of the sensing volume. The range gate will be different for each rangefinder. For those that look sideways from the vehicle, a minimum range distance of 3 feet is suitable. Maximum range for a sideways looking rangefinder is adjustable to suit driver preference and is typically about the width of one traffic lane. For those that look backwards, it preferably will vary with the driver and driving conditions. However, it should be sufficient to have a maximum range of 100 feet. Since the speed of light is approximately 1 foot per nanosecond, these distances correspond to a time range of 6 ns to 200 ns.

Although FIG. 3 shows the system as employed on the driver's side of the vehicle, it is readily apparent that a similar system having an enclosure 620 and mirror can be deployed on the passenger side of the vehicle, as is also included within this invention.

With each beam operated at 60 kHz, and using as an example ten successive pulses to define an averaged reading, it can be seen that a four beam system can be updated in less than one millisecond. An overtaking vehicle, closing at a relative speed of 40 miles per hour as an example, reduces the distance at a rate of less than one inch per millisecond. The system is essentially updated instantaneously.

While FIG. 3 shows a four beam system it is readily apparent that the same system could be employed with a different number of beams, for example six beams instead of four. The number of beams to be employed depends on the beam width and desired area of coverage, and many variations are apparent. Due to the size of the obstacles being detected it is not necessary to have 100 percent area coverage, and the precise percent of coverage is a design parameter of the system.

In the preferred embodiment, the system determines the time-of-flight or elapsed time between a transmitted and reflected pulse and assesses the situation on that determination. As will be apparent, the relationship between time and distance and velocity makes it possible to use distance determinations to achieve the same result and such usage will be recognized as the equivalent of the use of time-of-flight. For example, time-of-flight information can be stored as a time measurement or converted to a distance measurement by using the speed of the pulses emitted by the transmitter 10, i.e. the speed of light. And the measurement that is stored in the data averager 60 can be a running total or a running average. In either case the data is a measure of the location of the object that reflected the pulses.

As is also apparent, the 60 kHz frequency of the rangefinder can also be varied over a wide range of frequencies and the same result achieved.

As described, the rangefinders 200 are pulsed sequentially. As is also apparent, these rangefinder units can be operated continuously and sampled as required.

Other variations in the invention may be achieved by shifting more of the calculation and/or signal processing effort from the rangefinder 200 to the control unit 100. For example, the function of the data averager 60 and range gate discriminator 70 might readily be transferred to the control unit 100. Furthermore the operation of the system and the optics of the receiver units 20 may permit use of a single receiver unit 20 with multiple transmitter units 10. It is also possible to locate the rangefinder units 200 within the tail light assembly with the display unit 300 located at the side mirror position. Other variations will be apparent to those skilled in the art.

What is claimed is:

1. A system for detecting an external obstacle within a given distance and spatial location on a side of or to the rear of a vehicle comprising:

a rangefinder mounted on said vehicle for determining distance to an external obstacle within said spatial location including:

a transmitter of pulses of electromagnetic light radiation having a narrow beam width and a given pulse frequency transmitted within said spatial location;

a receiver that receives reflected light radiation pulses transmitted from the transmitter and reflected by said obstacle;

a timing device determining the time interval between pulses transmitted by said transmitter and reflected pulses from said obstacle received by said receiver where the time interval is less than approximately 200 nanoseconds and is a measure of the distance to said obstacle, said timing device including a digital clock producing clock pulses and a clock pulse counter activated to count clock pulses upon initiation of transmitter pulses and stopped upon receipt of reflected pulses by said receiver, said clock pulses being a measure of said time interval and said time interval between said transmitted and received pulses being a measure of distance to said obstacle;

a data averager connected to said clock pulse counter for maintaining a running average of time interval information of a plurality of successive transmitted and received pulses; and means for determining from said time interval information if the distance to said obstacle falls within a preset range between a lower distance bound and an upper distance bound, said means for determining distance within a preset range including a range gate discriminator receiving time interval information from said data averager;

control means for controlling the operation of said rangefinder and providing an output from said rangefinder upon occurrence of reflected pulses within said range; and a display receiving said output and displaying the results of the distance determination to the operator of the vehicle.

2. The system of claim 1 further comprising a plurality of rangefinders transmitting a plurality of beams within said spatial location wherein the means for determining if an obstacle is within the given distance considers information from each rangefinder in making its determination.

3. The system of claim 1 wherein the transmitter is an infrared laser diode, the receiver includes a photodiode, and the display includes light emitting diodes.

4. The system of claim 3 wherein the vehicle includes a side view mirror, said side view mirror having an enclosure mounted thereon including said rangefinder, said control means and said display.

5. The system of claim 3 wherein said transmitter produces pulses having a pulse width of the order of five nanoseconds.

6. The system of claim 5 wherein said transmitter pulses provide a beam width of approximately ten degrees.

* * * * *